J. B. HYDE.
INSULATING COMPOUND FOR ELECTRICAL CONDUCTORS AND APPARATUS FOR COMPOUNDING THE SAME.
No. 10,403. Reissued Nov. 6, 1883.
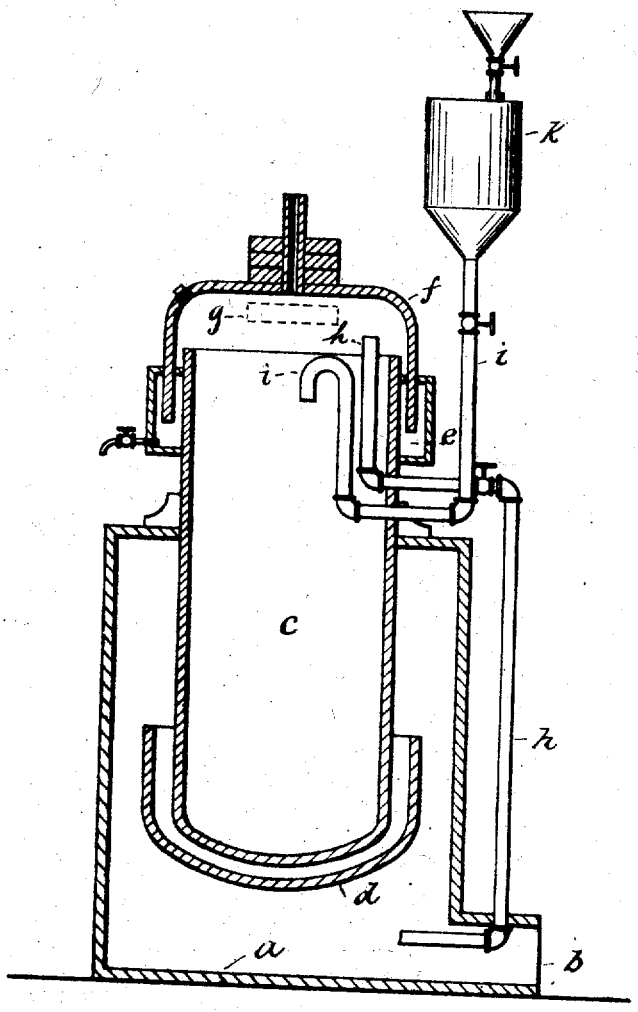
WITNESSES
Edward E. Ellis
Geo. H. Harry
INVENTOR
J. Burrows Hyde
per O. E. Duffy
Attorney

UNITED STATES PATENT OFFICE

J. BURROWS HYDE, OF NEW YORK, N. Y.

INSULATING COMPOUND FOR ELECTRICAL CONDUCTORS AND APPARATUS FOR COMPOUNDING THE SAME.

SPECIFICATION forming part of Reissued Letters Patent No. 10,403, dated November 6, 1883.

Original No. 231,999, dated July 24, 1883. Application for reissue filed October 13, 1883.

DIVISION A.

*To all whom it may concern:*

Be it known that I, J. BURROWS HYDE, a citizen of the United States, residing at New York, in the county of New York and State of New York, have invented certain new and useful Improvements in Insulating Compounds for Electrical Conductors and Apparatus for Compounding the Same, of which the following is a specification, reference being had to the accompanying drawing.

My invention relates to a combination of matters to form a new plastic compound for insulating electric conductors, and to apparatus for compounding the same.

In distilling petroleum a variety of products are evolved as vapors and condensed as fluids, and so remain unless again heated, whereas other of the products from the distillation are more or less plastic, and, finally, a residuum is left in the distilling-vessel, that closely resembles black glass from its color and luster, which, together with its fracture, closely resembles what is sometimes called "mineral asphaltum," and for convenience has been called "obsidian." Most of the distillates from petroleum have been employed for insulating electric wires by mixing the hard with the fluid product, and also with the softer or plastic residua. The obsidian itself, being a good non-conductor, must necessarily be softened either by the plastic or fluids to make the compound adhesive and pliable for coating wires.

Hitherto it has been the distillates only of petroleum that have been compounded for non-conducting uses, whereas my improvement is found equally efficient, far more economical, and under most conditions most convenient; and it consists in combining the obsidian or black residuum with petroleum itself, instead of with any one or more of its distillates, whether fluid, plastic, or otherwise, when cold, and for which combination of said ingredients I employ peculiar apparatus, which also forms a part of my invention.

In the drawing, the figure represents a vertical sectional elevation of the mixing apparatus.

*a* shows the heating-furnace, of iron or masonry, with feeding-door at *b*, the chimney being placed at any convenient locality, underground or otherwise, and not shown in the drawing.

*c* represents the smelting-kettle, fixed firmly and suspended in the furnace.

*d* shows an apron under the bottom of the kettle, to screen it from intense heat.

Around the exterior of *c*, and near its top, a channel, *e*, is made for a water-seal, but in which I prefer to employ melted metal, as lead and bismuth; but water saturated with a salt or other matter may be used.

*f* shows a sealing-vessel or vapor-holder, seated in the channel *e*, having adjustable pressure-weights upon its top, and also a weighted valve.

*g* in dotted lines are loop-handles on opposite sides of *f*, to facilitate lifting it to and from its position.

*h* shows a vertical pipe, inside of and extending above the top of *c* into the vapor-chamber; then, by vertical and horizontal direction, downward and through the side of *c*, and terminating within the furnace *a*, and having in its train a stop-cock, as shown, a second pipe, *i*, commencing with a goose-neck bend, also within and near the top of *c*. This also passes downward and through the side of *c*, and then upward, terminating in a charging-vessel, *k*, into the top of which a funnel is fixed. Stop-cocks are shown in the train above and below this vessel *k*.

In operating this apparatus I proceed as follows: In the vessel *c*, I place five to ten pounds of obsidian or hard residuum from petroleum-distillation, broken into about egg size, with about an equal bulk of crude petroleum, having filled *e* with a strong solution of salt and water, which is to be drawn off and substituted by the melted metal when too hot. Now start the fire and open the cock in *h*. The vapors from the oil will escape by the pipe into the furnace, and burn there as fuel to heat the kettle. Meantime the charging-vessel should be filled with petroleum. If the volume of vapor shall exceed the relieving capacity of the pipe *h* (it will be shown by the action of the holder *f*) at any time, the oil-flow from *k* should be shut off and the escape-valve in *f* be opened. When the vapors of the first charge slacken or cease to flow, the sealing-vessel may be removed and the contents in the kettle be incorporated by stirring. Then add a second charge of obsidian, as before, stirring it with the charge as melted, replace the vessel *f*, and turn on the oil in *k* gradually, and repeat, as before, until the vessel *c* is about three-fourths filled. The composition should be of such a tenacity that it will not stick to the fingers when it is cold, and it should be soft to retain the impress of the finger and thumb when pinched, the proportions being changed to meet those conditions according to the temperature of the external air. In this condition of heated fluid the composition may be ladled from the vessel *c* into a molding kettle or apparatus; but a quantity sufficient to cover the bottom to a depth of not less than three or four inches should be left in the melting-kettle *c* to facilitate treating subsequent charges.

Having thus described my invention, what I claim is—

1. An insulating compound for electric uses, composed of the hard bituminous residuum from petroleum-distillation, melted and combined with natural petroleum or mineral oil, substantially as described.

2. An insulating compound for covering telegraph or telephone wires, composed of petroleum or mineral oils combined, under heat, in a closed vessel, with the bituminous residua aggregated from distilling petroleum, substantially as described.

3. In the process of combining the residua of petroleum, as described, with crude petroleum, the melting and mixing vessel *c*, combined with the sealing-cover *f*, seal *e*, pipes *h* *i*, and charger *k*, with their respective attachments, when constructed and arranged in the manner and for the purpose substantially as set forth.

In testimony whereof I affix my signature in presence of two witnesses.

J. BURROWS HYDE.

Witnesses:

B. F. MORSELL,

EDWARD E. ELLIS.